United States Patent
Hu et al.

(10) Patent No.: US 11,182,002 B2
(45) Date of Patent: Nov. 23, 2021

(54) INFRARED TOUCH DISPLAY DEVICE AND METHOD OF FABRICATING SAME

(71) Applicant: SHENZHEN CHINA STAR OPTOELECTRONICS SEMICONDUCTOR DISPLAY TECHNOLOGY CO., LTD., Shenzhen (CN)

(72) Inventors: Chungming Hu, Shenzhen (CN); Yuchun Hsiao, Shenzhen (CN); Guofu Tang, Shenzhen (CN); Mingjun Zhou, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/625,713

(22) PCT Filed: Nov. 5, 2019

(86) PCT No.: PCT/CN2019/115492
§ 371 (c)(1),
(2) Date: Dec. 22, 2019

(87) PCT Pub. No.: WO2021/003909
PCT Pub. Date: Jan. 14, 2021

(65) Prior Publication Data
US 2021/0124446 A1   Apr. 29, 2021

(30) Foreign Application Priority Data
Jul. 9, 2019 (CN) .......................... 201910613034.0

(51) Int. Cl.
*G06F 3/041* (2006.01)
*G06F 3/042* (2006.01)

(52) U.S. Cl.
CPC .......... *G06F 3/0412* (2013.01); *G06F 3/0421* (2013.01); *G06F 2203/04103* (2013.01)

(58) Field of Classification Search
CPC ........ G09G 3/0421; G06F 2203/04103; G02B 6/0083; G02B 6/0076; G02B 6/42;
(Continued)

(56) References Cited

U.S. PATENT DOCUMENTS

2014/0016253 A1* 1/2014 Lee ........................ B23K 35/24
361/679.01
2016/0343984 A1* 11/2016 Zeng ....................... G06F 3/045
(Continued)

FOREIGN PATENT DOCUMENTS

CN          105677071 A       6/2016
CN          109656404    *    4/2019   ............ G06F 3/041
(Continued)

*Primary Examiner* — Sanjiv D. Patel

(57) ABSTRACT

The present application provides an infrared touch display device and a fabrication method thereof. In the present application, a cover plate coated with a sealant and a display panel are sent into a vacuum chamber and vacuumed; when the cover plate is attached to the display panel, the cover plate corresponds to The portion of the central portion enclosed by the frame rubber is recessed toward the display panel side and closely fits with the display panel, and the periphery of the display panel and the periphery of the cover plate are sealed by the sealant; Group infrared emitting tubes and infrared receiving tube.

13 Claims, 5 Drawing Sheets

(58) Field of Classification Search
CPC .............. G02B 27/4277; G02B 26/001; G02B 6/0055; G02B 6/0045; G02F 1/13338; G02F 1/225
See application file for complete search history.

(56) References Cited

U.S. PATENT DOCUMENTS

2017/0177107 A1* 6/2017 Sha ..................... G06F 3/0421
2020/0040131 A1* 2/2020 Fukamoto ............ C08G 59/223

FOREIGN PATENT DOCUMENTS

| CN | 109656404 A | 4/2019 |
| CN | 109739380 A | 5/2019 |

* cited by examiner applying a sealant on a periphery of a display panel or a cover plate; — S10 delivering the cover plate and the display panel into a vacuum chamber, and vacuuming the vacuum chamber by using a vacuum pump in a sealed environment; — S20 aligning and bonding the cover plate with the display panel, wherein in a vacuum environment, a portion of the cover plate corresponding to a central portion surrounded by the sealant is recessed toward the display panel and closely attached to the display panel, and the periphery of the display panel and the periphery of the cover plate are sealed by the sealant; and — S30 providing an infrared touch component around the cover plate, wherein the infrared touch component comprises a plurality of sets of infrared emitting tubes and infrared receiving tubes disposed in a one-by-one correspondence to each other. — S40

FIG. 2

INFRARED TOUCH DISPLAY DEVICE AND METHOD OF FABRICATING SAME

BACKGROUND OF INVENTION

Field of Invention

The present application relates to a field of display technologies, and in particular, to an infrared touch display device and a method of fabricating the same.

Description of Prior Art

In a display field, infrared touch currently dominates a large part of the market due to mature technology, accurate touch accuracy, and cost-effective advantage. The infrared touch is to analyze a touch position through positioning by blocking the infrared light emitted by an infrared frame. A display panel and a glass cover plate are generally combined primarily by a direct-bonding or air-bonding. The touch display device that is attached by the air-bonding technology has lower cost than the touch display device that is attached by the direct-bonding technology. However, the air-bonding technology solely relies on a sealant for the sealing, and a cavity is formed between a central portion of the cover plate and a central portion of the display panel, causing problems of poor waterproof and dustproof effects and a sense of separation, resulting in a bad experience. In addition, when the infrared touch is close to a surface of the cover plate, due to poor stability of the cavity, the cover plate may protrude to block the signal transmission.

Therefore, there is an urgent need to improve drawbacks of the prior art.

SUMMARY OF INVENTION

The present invention provides an infrared touch display device and a method of fabricating the same, which can solve the problems of poor waterproof and dustproof effects and a sense of separation, resulting in a bad experience and impact on infrared touch performance, when the cover plate is bonded to a conventional infrared touch display device.

In order to solve the above problems, the technical solution provided by the present application is as follows:

The present application provides a method of fabricating an infrared touch display device, including the following steps:

step S10, applying a sealant on a periphery of a display panel or a cover plate;

step S20, delivering the cover plate and the display panel into a vacuum chamber, and vacuuming the vacuum chamber by using a vacuum pump in a sealed environment;

step S30, aligning and bonding the cover plate with the display panel, wherein in a vacuum environment, a portion of the cover plate corresponding to a central portion surrounded by the sealant is recessed toward the display panel and closely attached to the display panel, and the periphery of the display panel and the periphery of the cover plate are sealed by the sealant; and step S40, providing an infrared touch component around the cover plate, wherein the infrared touch component includes a plurality of sets of infrared emitting tubes and infrared receiving tubes disposed in a one-by-one correspondence to each other.

In the fabrication method of the present application, the step S30 specifically includes the following steps:

vacuuming a cavity enclosed by the cover plate and the display panel through a gap between the sealant and the cover plate/the display panel by the vacuum pump when the cover plate and the display panel are about to be bonded, such that the cover plate receives a pressure toward the display panel, and the portion of the cover plate corresponding to the central portion is recessed toward the display panel and closely attached to the display panel.

In the fabrication method of the present application, the display panel and the cover plate are heated by a heating device in the vacuum chamber in a vacuum environment, so that the sealant is melted and deformed under a pressure of vacuuming the vacuum chamber, so that the melted sealant fully fills a gap between the cover plate and the display panel at a side of the sealant near the cavity.

In the fabrication method of the present application, the cover plate and the display panel are irradiated with an ultraviolet ray so that the melted sealant is cured.

In the fabrication method of the present application, in the step S40, the infrared emitting tubes and the infrared receiving tubes disposed in a one-by-one correspondence to each other are respectively disposed on opposite sides of the cover plate and disposed in a non-recessed area of the cover plate, the infrared emitting tubes are configured to emit infrared rays, the infrared receiving tubes are configured to receive the infrared rays emitted by the infrared emitting tube, and the plurality of sets of the infrared emitting tubes and the infrared receiving tubes are formed into a horizontally-vertically intersecting infrared matrix, and a coordinate position of a touch point on the cover plate is calculated by data of a portion of the infrared rays shaded by an operator's finger which touches the cover plate measured based on a combination of the infrared emitting tubes and the infrared receiving tubes.

The present application also provides an infrared touch display device, including:

a display panel;

a cover plate disposed on the display panel; and an infrared touch component disposed on the cover plate, wherein the infrared touch component includes a plurality of sets of infrared emitting tubes and infrared receiving tubes disposed in a one-by-one correspondence to each other, a periphery of the display panel and a periphery of the cover plate are attached by a sealant, and a portion of the cover plate corresponding to a central portion surrounded by the sealant is closely attached to the display panel.

In the infrared touch display device of the present application, the portion of the cover plate corresponding to the central portion surrounded by the sealant is recessed toward the display panel and closely attached to the display panel.

In the infrared touch display device of the present application, the infrared emitting tubes and the infrared receiving tubes are respectively disposed on opposite sides of the cover plate and disposed in a non-recessed area of the cover plate, the infrared emitting tubes are configured to emit infrared rays, the infrared receiving tubes are configured to receive the infrared rays emitted by the infrared emitting tube, and the plurality of sets of the infrared emitting tubes and the infrared receiving tubes are formed into a horizontally-vertically intersecting infrared matrix, and a coordinate position of a touch point on the cover plate is calculated by data of a portion of the infrared rays shaded by an operator's finger which touches the cover plate measured based on a combination of the infrared emitting tubes and the infrared receiving tubes.

In the infrared touch display device of the present application, a surface of the cover plate adjacent to the infrared touch component is a horizontal plane, and a thickness of a central region of the cover plate is greater than a thickness of a periphery region of the cover plate.

In order to solve the above technical problems, the present application further provides an infrared touch display device, including:

a display panel;

a cover plate disposed on the display panel; and an infrared touch component disposed on the cover plate, wherein the infrared touch component includes a plurality of sets of infrared emitting tubes and infrared receiving tubes disposed in a one-by-one correspondence to each other, a periphery of the display panel and a periphery of the cover plate are attached by a sealant, a portion of the cover plate corresponding to a central portion surrounded by the sealant is closely attached to the display panel, and the sealant fully fills a gap between the cover plate and the display panel to fix the cover plate on the display panel.

In the infrared touch display device of the present application, the portion of the cover plate corresponding to the central portion surrounded by the sealant is recessed toward the display panel and closely attached to the display panel.

In the infrared touch display device of the present application, the infrared emitting tubes and the infrared receiving tubes are respectively disposed on opposite sides of the cover plate and disposed in a non-recessed area of the cover plate, the infrared emitting tubes are configured to emit infrared rays, the infrared receiving tubes are configured to receive the infrared rays emitted by the infrared emitting tube, and the plurality of sets of the infrared emitting tubes and the infrared receiving tubes are formed into a horizontally-vertically intersecting infrared matrix, and a coordinate position of a touch point on the cover plate is calculated by data of a portion of the infrared rays shaded by an operator's finger which touches the cover plate measured based on a combination of the infrared emitting tubes and the infrared receiving tubes.

In the infrared touch display device of the present application, a surface of the cover plate adjacent to the infrared touch component is a horizontal plane, and a thickness of a central region of the cover plate is greater than a thickness of a periphery region of the cover plate.

Beneficial effects of the present disclosure are that: the infrared touch display device and the method of fabricating the same employ an air-bonding method to bond the cover plate with the display panel in a vacuum environment, and a portion of the cover plate corresponding to a central portion surrounded by the sealant is pressed toward the display panel in the vacuum environment, such that the cover plate is recessed toward the display panel and closely attached to the display panel, thereby eliminating the sense of separation between the cover plate and the display panel, enhancing user's experience. In addition, such a method can make the cover plate and the display panel fully bonded, and enhance the waterproof and dustproof effects of the display device in the sealant. Furthermore, the infrared touch component is disposed in the non-recessed area of the cover plate, and the central portion of the cover plate is recessed, so as to avoid the problem that the cover plate may protrude to block the signal transmission when the infrared touch component is prepared on the surface of the cover plate.

BRIEF DESCRIPTION OF DRAWINGS

In order to more clearly illustrate the embodiments or the technical solutions of the existing art, the drawings illustrating the embodiments or the existing art will be briefly described below. Obviously, the drawings in the following description merely illustrate some embodiments of the present invention. Other drawings may also be obtained by those skilled in the art according to these figures without paying creative work.

FIG. 2 is a flow chart of a method of fabricating an infrared touch display device according to an embodiment of the present application.

DETAILED DESCRIPTION OF PREFERRED EMBODIMENTS

Figure 1:
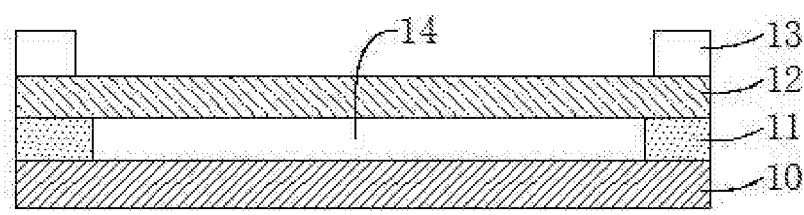
FIG. 1 is a schematic structural diagram of an infrared touch display device in the prior art.

The following description of the various embodiments is provided to illustrate the specific embodiments of the invention. Directional terms mentioned in the present invention, such as "vertical", "horizontal", "upper", "bottom", "pre", "post", "left", "right", "inside", "outside", "side", etc., only refer to the direction of the additional drawing. Therefore, the directional terminology used is for the purpose of illustration and understanding of the invention. In the figures, structurally similar elements are denoted by the same reference numerals.

First, the prior art will be briefly described. Referring to FIG. 1, FIG. 1 is a schematic structural diagram of an infrared touch display device in the prior art. The infrared touch display device includes a display panel 10, a cover plate 12 disposed above the display panel 10, a colloid 11 disposed between the display panel 10 and the cover plate 12, and an infrared touch component 13 disposed on a periphery of the cover plate 12. The colloid 11 is configured to bond the display panel 10 and the cover plate 12. However, a cavity 14 (air layer) is present between the display panel 10 and the cover plate 12 when they are fixed by such a bonding method, which causes the display device to have a sense of separation, which not only impacts the user's experience and display effect, but also cause problems such as poor dustproof and waterproof effects of the display device inside the colloid 11 due to the cavity 14.

The present application aims to solve the technical problems that the existing infrared touch display device has poor waterproof and dustproof effects and a sense of separation when the cover plate is attached, which causes poor experience, and impacts infrared touch performance, etc.

Figure 3:
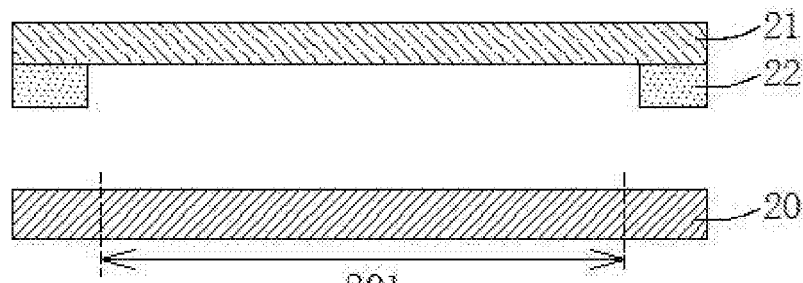
FIG. 3 to FIG. 8 are schematic diagrams showing a fabrication process of an infrared touch display device according to an embodiment of the present application.

FIG. 2 is a flow chart of a method of fabricating an infrared touch display device according to an embodiment of the present application. Specifically, an LCD display panel is taken as an example, but the disclosure is not particularly limited thereto. Referring to FIG. 3 to FIG. 8, the method includes the following steps:

Step S10, as shown in FIG. 3, applying a sealant 22 on a periphery of a display panel 20 or a cover plate 21.

Specifically, the sealant 22 is coated on the peripheral of the surface of the cover plate 21 facing the display panel 20, and a coating position of the sealant 22 corresponds to a non-display area at a periphery of a display area 201 of the display panel 20. The sealant 22 may be a liquid glue or a solid glue, which is not particularly limited herein.

In other embodiments, the sealant 22 may also be alternatively formed in the non-display area of the peripheral of the display panel 20.

Figure 4:
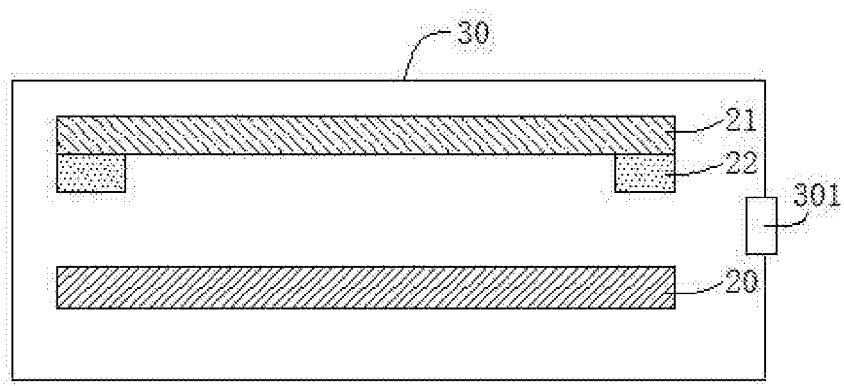

Step S20, as shown in FIG. 4, delivering the cover plate 21 and the display panel 20 into a vacuum chamber 30, and vacuuming the vacuum chamber 30 by using a vacuum pump 301 in a sealed environment.

Figure 5:
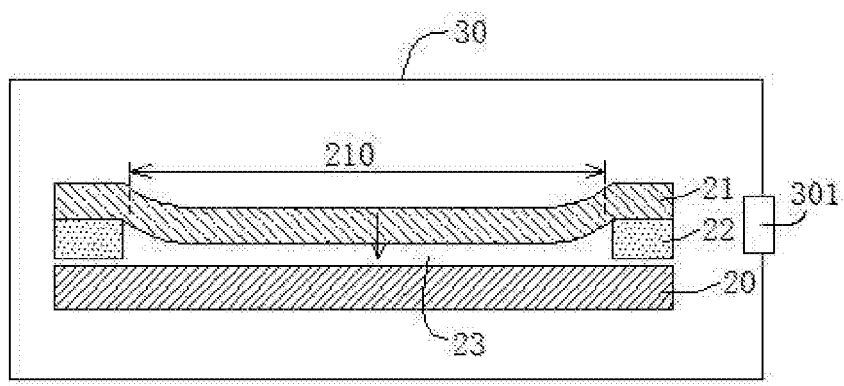
Figure 6:
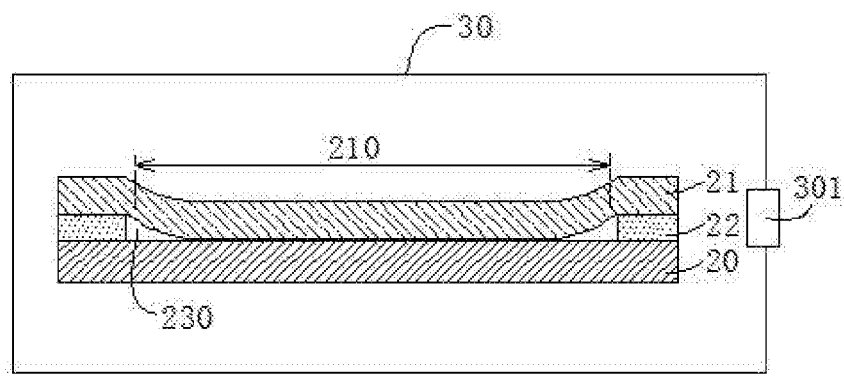
Figure 7:
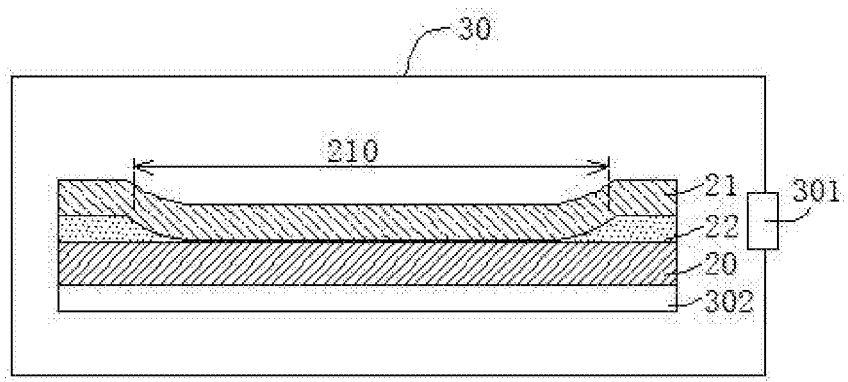

Step S30, as shown in FIG. 5 to FIG. 7, aligning and bonding the cover plate 21 with the display panel 20, wherein in a vacuum environment, a portion of the cover plate 21 corresponding to a central portion 210 surrounded by the sealant 22 is recessed toward the display panel 20 and closely attached to the display panel 20, and the periphery of the display panel 20 and the periphery of the cover plate 21 are sealed by the sealant 22.

Specifically, as shown in FIG. 5, the step S30 includes the following steps:

vacuuming a cavity 23 enclosed by the cover plate 21 and the display panel 20 through a gap between the sealant 22 and the cover plate 22 and the display panel 20 by the vacuum pump 301 when the cover plate 21 and the display panel 20 are about to be bonded, such that the cover plate 21 receives a pressure toward the display panel 20, and the portion of the cover plate 21 corresponding to the central portion 210 is recessed toward the display panel 20 and closely attached to the display panel 20, that is, the portion of the cover plate 21 corresponding to the central portion 210 is slightly deformed toward the side of the display panel 20.

The cover plate 21 and the display panel 20 continue to be bonded. As shown in FIG. 6, the portion of the cover plate 21 corresponding to the central portion 210 is closely attached correspondingly to the portion of the display panel 20 corresponding to the central portion 210, and the peripheral of the display panel 20 and the peripheral of the cover plate 21 are attached with each other by the sealant 22. Due to a height difference caused by the sealant 22, there is a gap 230 between a position at which the cover plate 21 and the display panel 20 are attached with each other by the sealant 22 and a position where the cover plate 21 is directly attached to the display panel 20. The following operations are required due to the presence of the gap 230:

The display panel 20 and the cover plate 21 are heated by a heating device 302 in the vacuum chamber 30 in a vacuum environment, so that the sealant 22 is melted and deformed under a pressure of vacuuming the vacuum chamber 30, so that the melted sealant 22 fully fills a gap 230 between the cover plate 21 and the display panel 20 at a side of the sealant 22 near the cavity 23, as shown in FIG. 7.

Thereafter, the cover plate 21 and the display panel 20 are irradiated with an ultraviolet ray so that the melted sealant 22 is cured to complete the sealing of the cover plate 21 and the display panel 20.

In this embodiment, by means of vacuuming, the cover plate and the display panel are fully bonded with each other to eliminate the sense of separation between the cover plate and the display panel, thereby enhancing the user's experience. In addition, there is no air layer between the cover plate and the display panel, which provides good waterproof and dustproof effects. Moreover, compared with the problems of high cost and complicated bonding process caused by the conventional direct-bonding, the present application only needs to introduce a circle of adhesive material at the periphery, thus having advantages of low cost, simple process, and high yield without impacting the display effect.

Figure 8:
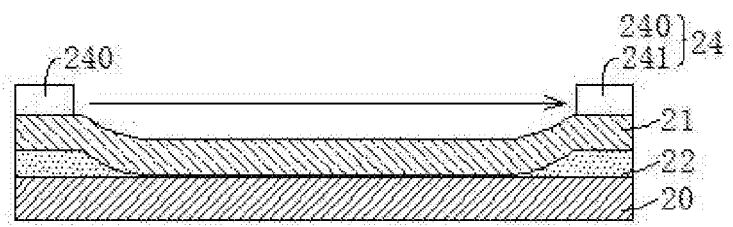

In step S40, as shown in FIG. 8, providing an infrared touch component 24 around the cover plate 21, wherein the infrared touch component 24 includes a plurality of sets of infrared emitting tubes 240 and infrared receiving tubes 241 disposed in a one-by-one correspondence to each other.

Specifically, in the step S40, the infrared emitting tubes 240 and the infrared receiving tubes 241 disposed in a one-by-one correspondence to each other are respectively disposed on opposite sides of the cover plate 21 and disposed in a non-recessed area of the cover plate (that is, outside of the central portion 210). The infrared emitting tubes 240 are configured to emit infrared rays, the infrared receiving tubes 241 are configured to receive the infrared rays emitted by the infrared emitting tubes 240, and the plurality of sets of the infrared emitting tubes 240 and the infrared receiving tubes 241 are formed into a horizontally-vertically intersecting infrared matrix, and a coordinate position of a touch point on the cover plate 21 is calculated by data of a portion of the infrared rays shaded by an operator's finger which touches the cover plate 21 measured based on a combination of the infrared emitting tubes 240 and the infrared receiving tubes 241, thus achieving the touch function.

In this embodiment, since the infrared touch component 24 is disposed in the non-recessed area of the cover plate 21, and the central portion 210 of the cover plate 21 forms a recess, the problem that when the infrared touch component 24 is prepared on the surface of the cover plate 21, the portion of the cover plate 21 corresponding the central portion 210 protrudes (being slightly deformed) to block signal transmission due to the influence of the gravity of the infrared touch component 24 and the instability of the cavity can be avoided.

Figure 9:
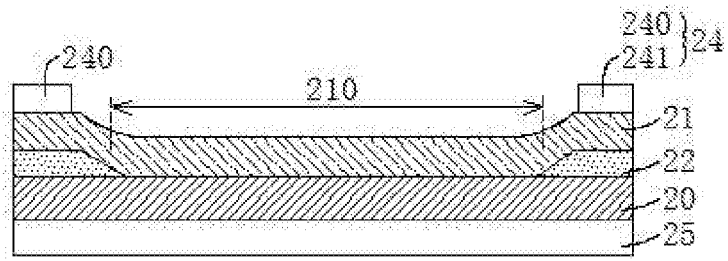
FIG. 9 is a schematic structural diagram of an infrared touch display device according to an embodiment of the present application.

The present application also provides an infrared touch display device fabricated by the above method. As shown in FIG. 9, the infrared touch display device includes, but is not limited to, a backlight unit 25, a display panel 20 located on the backlight unit 25, a cover plate 21 located on the display panel 20, and an infrared touch component 24 located on the cover plate 21. A peripheral of the display panel 20 and a peripheral of the cover plate 21 are bonded the sealant 22; the portion of the cover plate 21 corresponding to the central portion 210 surrounded by the sealant 22 is closely attached to the display panel 20, and a projection of the central region 210 on the display panel 20 covers the display area 201 of the display panel 20.

In a vacuumed environment, the portion of the cover plate 21 corresponding to the central portion 210 surrounded by the sealant 22 is recessed toward the display panel 20 and closely attached to the display panel 20, and the sealant 22 fully fills a gap between the cover plate 21 and the display panel 20 to fix the cover plate 21 on the display panel 20.

This embodiment achieves a full-bonding between the cover plate and the display panel, thereby eliminating the sense of separation between the cover plate and the display panel, and enhancing the user's experience. In addition, there is no air layer between the cover plate and the display panel, which provides good waterproof and dustproof effects.

Figure 10:
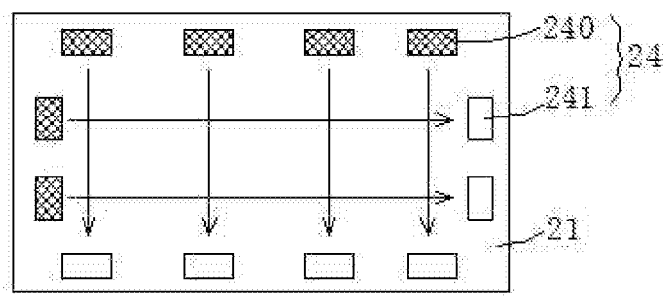
FIG. 10 is a top plan diagram of the infrared touch display device shown in FIG. 9.

As shown in FIG. 10, the infrared touch control component 24 includes a plurality of sets of infrared transmitting tubes 240 and infrared receiving tubes 241 disposed in a one-by-one correspondence to each other. The infrared emitting tubes 240 and the infrared receiving tubes 241 disposed in a one-by-one correspondence to each other are respectively disposed on opposite sides of the cover plate 21 and disposed in a non-recessed area of the cover plate 21. The plurality of sets of the infrared emitting tubes 240 and the infrared receiving tubes 241 are formed into a horizontally-vertically intersecting infrared matrix, and a coordinate position of a touch point on the cover plate 21 is calculated by data of a portion of the infrared rays shaded by an operator's finger which touches the cover plate 21 measured based on a combination of the infrared emitting tubes 240 and the infrared receiving tubes 241, the data corresponding to the coordinate position, thus achieving the touch function. Details are not repeated herein for brevity.

Figure 11:
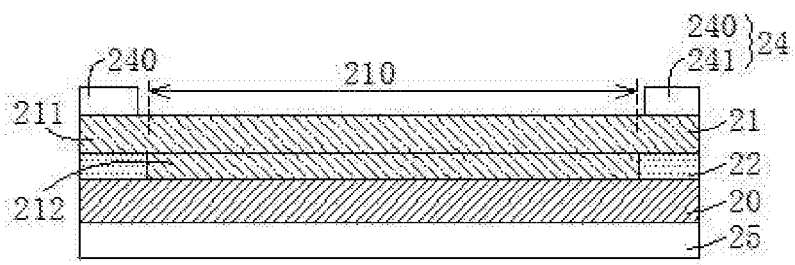
FIG. 11 is a schematic structural diagram of another infrared touch display device according to an embodiment of the present application.

FIG. 11 is a schematic structural diagram of another infrared touch display device provided by an embodiment of the present application. Compared with the infrared touch display device shown in FIG. 9, a difference therebetween is that a surface of the cover plate 21 adjacent to the infrared touch component 24 is a horizontal plane, and a thickness of a central region 210 of the cover plate 21 is greater than a thickness of a periphery region of the cover plate 21.

The cover plate 21 includes a main body 211 and a protrusion 212 disposed on a surface of the cover plate 21 facing the display panel 20 and corresponding to the central portion 210 of the cover plate 21. The sealant 22 is disposed on a periphery of the protrusion 212, and a thickness of the sealant 22 is greater than or equal to a thickness of the protrusion 212.

In an embodiment, in order to ensure good sealing performance of the sealant 22, the thickness of the sealant 22 is slightly larger than the thickness of the protrusion 212. When the cover plate 21 and the display panel 20 are about to be bonded, in a vacuum environment, the cover plate 21 is subjected to pressure toward the display panel 20, so that the cover plate 21 is attached to the display panel 20 through the sealant 22, and at the same time, the heating device in the vacuum chamber heats the cover plate 21 and the display panel 20 such that the sealant 22 is melted, the protrusion 212 of the cover plate 21 is in contact with the display panel 20 in a vacuum environment, and the melted sealant 22 fills the gap formed between the cover plate 21 and the display panel 20, thereby achieving full-bonding between the cover plate 21 and the display panel 20.

In another embodiment, a surface of the protrusion 212 adjacent to the sealant 22 is a curved surface, and the melted sealant 22 fully fills the gap formed between the curved surface and the display panel 20

In this embodiment, by changing the structural design of the cover plate 21, the cavity between the cover plate and the display panel in the conventional structure is filled without deformation of the cover plate 21, thereby realizing full-bonding between the cover plate and the display panel, eliminating the sense of separation between the cover plate and the display panel, and enhancing the user's experience. In addition, there is no air layer between the cover plate and the display panel, which provides good waterproof and dustproof effects. Moreover, the surface of the infrared touch component 24 is flat, and does not impact the touch performance of the infrared touch component 24.

While the invention has been described by way of example and in terms of the preferred embodiments, it is to be understood that the invention is not limited to the disclosed embodiments. To the contrary, it is intended to cover various modifications and similar arrangements. Therefore, the scope of the appended claims should be accorded the broadest interpretation so as to encompass all such modifications and similar arrangements.

What is claimed is:

1. A method of fabricating an infrared touch display device, wherein the method comprises the following steps:
   step S10, applying a sealant on a periphery of a display panel or a cover plate;
   step S20, delivering the cover plate and the display panel into a vacuum chamber, and vacuuming the vacuum chamber by using a vacuum pump in a sealed environment;
   step S30, aligning and bonding the cover plate with the display panel, wherein in a vacuum environment, a portion of the cover plate corresponding to a central portion surrounded by the sealant is recessed toward the display panel and closely attached to and in direct contact with the display panel, and the periphery of the display panel and the periphery of the cover plate are sealed by the sealant; and
   step S40, providing an infrared touch component around the cover plate, wherein the infrared touch component comprises a plurality of sets of infrared emitting tubes and infrared receiving tubes disposed in a one-by-one correspondence to each other.

2. The fabrication method according to claim 1, wherein the step S30 comprises the following steps:
   vacuuming a cavity enclosed by the cover plate and the display panel through a gap between the sealant and the cover plate/the display panel by the vacuum pump when the cover plate and the display panel are about to be bonded, such that the cover plate receives a pressure toward the display panel, and the portion of the cover plate corresponding to the central portion is recessed toward the display panel and closely attached to and in direct contact with the display panel.

3. The fabrication method according to claim 2, wherein the display panel and the cover plate are heated by a heating device in the vacuum chamber in a vacuum environment, so that the sealant is melted and deformed under a pressure of vacuuming the vacuum chamber, so that the melted sealant fully fills a gap between the cover plate and the display panel at a side of the sealant near the cavity.

4. The fabrication method according to claim 3, wherein the cover plate and the display panel are irradiated with an ultraviolet ray so that the melted sealant is cured.

5. The fabrication method according to claim 1, wherein in the step S40, the infrared emitting tubes and the infrared receiving tubes disposed in a one-by-one correspondence to each other are respectively disposed on opposite sides of the cover plate and disposed in a non-recessed area of the cover plate, the infrared emitting tubes are configured to emit infrared rays, the infrared receiving tubes are configured to receive the infrared rays emitted by the infrared emitting tubes, and the plurality of sets of the infrared emitting tubes and the infrared receiving tubes are formed into a horizontally-vertically intersecting infrared matrix, and a coordinate position of a touch point on the cover plate is calculated by data of a portion of the infrared rays shaded by an operator's finger which touches the cover plate measured based on a combination of the infrared emitting tubes and the infrared receiving tubes.

6. An infrared touch display device, comprising:
a display panel;
a cover plate disposed on the display panel; and
an infrared touch component disposed on the cover plate, wherein the infrared touch component comprises a plurality of sets of infrared emitting tubes and infrared receiving tubes disposed in a one-by-one correspondence to each other,
a periphery of the display panel and a periphery of the cover plate are attached by a sealant, and
a portion of the cover plate corresponding to a central portion surrounded by the sealant is closely attached to and in direct contact with the display panel.

7. The infrared touch display device according to claim 6, wherein the portion of the cover plate corresponding to the central portion surrounded by the sealant is recessed toward the display panel and closely attached to and in direct contact with the display panel.

8. The infrared touch display device according to claim 7, wherein the infrared emitting tubes and the infrared receiving tubes are respectively disposed on opposite sides of the cover plate and disposed in a non-recessed area of the cover plate, the infrared emitting tubes are configured to emit infrared rays, the infrared receiving tubes are configured to receive the infrared rays emitted by the infrared emitting tube, and the plurality of sets of the infrared emitting tubes and the infrared receiving tubes are formed into a horizontally-vertically intersecting infrared matrix, and a coordinate position of a touch point on the cover plate is calculated by data of a portion of the infrared rays shaded by an operator's finger which touches the cover plate measured based on a combination of the infrared emitting tubes and the infrared receiving tubes.

9. The infrared touch display device according to claim 6, wherein a surface of the cover plate adjacent to the infrared touch component is a horizontal plane, and a thickness of a central region of the cover plate is greater than a thickness of a periphery region of the cover plate.

10. An infrared touch display device, comprising:
a display panel;
a cover plate disposed on the display panel;
an infrared touch component disposed on the cover plate, wherein the infrared touch component comprises a plurality of sets of infrared emitting tubes and infrared receiving tubes disposed in a one-by-one correspondence to each other,
a periphery of the display panel and a periphery of the cover plate are attached by a sealant,
a portion of the cover plate corresponding to a central portion surrounded by the sealant is closely attached to and in direct contact with the display panel, and the sealant fully fills a gap between the cover plate and the display panel to fix the cover plate on the display panel.

11. The infrared touch display device according to claim 10, wherein the portion of the cover plate corresponding to the central portion surrounded by the sealant is recessed toward the display panel and closely attached to and in direct contact with the display panel.

12. The infrared touch display device according to claim 11, wherein the infrared emitting tubes and the infrared receiving tubes are respectively disposed on opposite sides of the cover plate and disposed in a non-recessed area of the cover plate, the infrared emitting tubes are configured to emit infrared rays, the infrared receiving tubes are configured to receive the infrared rays emitted by the infrared emitting tube, and the plurality of sets of the infrared emitting tubes and the infrared receiving tubes are formed into a horizontally-vertically intersecting infrared matrix, and a coordinate position of a touch point on the cover plate is calculated by data of a portion of the infrared rays shaded by an operator's finger which touches the cover plate measured based on a combination of the infrared emitting tubes and the infrared receiving tubes.

13. The infrared touch display device according to claim 10, wherein a surface of the cover plate adjacent to the infrared touch component is a horizontal plane, and a thickness of a central region of the cover plate is greater than a thickness of a periphery region of the cover plate.

* * * * *